(12) United States Patent
Ramalho de Oliveira et al.

(10) Patent No.: US 10,091,733 B2
(45) Date of Patent: Oct. 2, 2018

(54) SYSTEMS AND METHODS FOR POWER MANAGEMENT IN A NETWORK OF MOVING THINGS, FOR EXAMPLE INCLUDING A NETWORK OF AUTONOMOUS VEHICLES

(71) Applicant: Veniam, Inc., Mountain View, CA (US)

(72) Inventors: Patrícia Cristina Ramalho de Oliveira, Vila Nova de Gaia (PT); Carlos Eduardo Braga Ameixieira, Porto (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/377,179

(22) Filed: Dec. 13, 2016

(65) Prior Publication Data
US 2017/0238258 A1  Aug. 17, 2017

Related U.S. Application Data

(60) Provisional application No. 62/295,602, filed on Feb. 16, 2016.

(51) Int. Cl.
| | |
|---|---|
| *H04W 52/02* | (2009.01) |
| *H04W 4/46* | (2018.01) |
| *H04L 12/24* | (2006.01) |
| *H04L 29/08* | (2006.01) |
| *H04W 4/02* | (2018.01) |
| *H04W 84/18* | (2009.01) |
| *H04W 4/021* | (2018.01) |

(52) U.S. Cl.
CPC ..... *H04W 52/0261* (2013.01); *H04L 41/0806* (2013.01); *H04L 67/10* (2013.01); *H04W 4/021* (2013.01); *H04W 4/46* (2018.02); *H04W 84/18* (2013.01); *Y02D 70/1262* (2018.01); *Y02D 70/142* (2018.01); *Y02D 70/144* (2018.01); *Y02D 70/164* (2018.01); *Y02D 70/22* (2018.01); *Y02D 70/26* (2018.01)

(58) Field of Classification Search
CPC .... H04L 41/0806; H04L 67/10; H04W 4/021; H04W 52/0261; H04W 84/005; H04W 4/46; H04W 84/18; Y02D 70/1262; Y02D 70/142; Y02D 70/144; Y02D 70/164; Y02D 70/22; Y02D 70/26
See application file for complete search history.

(56) References Cited

U.S. PATENT DOCUMENTS

| | | | | |
|---|---|---|---|---|
| 6,141,565 | A * | 10/2000 | Feuerstein | H04W 16/06 455/422.1 |
| 8,160,574 | B1 * | 4/2012 | Nelson | H04W 52/24 340/517 |
| 8,301,925 | B2 * | 10/2012 | Tolentino | G06F 1/266 713/321 |

(Continued)

*Primary Examiner* — Lewis West
(74) *Attorney, Agent, or Firm* — McAndrews, Held & Malloy, Ltd.

(57) ABSTRACT

Systems and methods for power management in a network of moving things. As non-limiting examples, various aspects of this disclosure provide systems and methods for utilizing information from various sensors and/or other information sources to determine when and/or how to operate a node (e.g., a Mobile AP, Fixed AP, etc.) in a power saving mode.

21 Claims, 12 Drawing Sheets

(56) References Cited

U.S. PATENT DOCUMENTS

| | | | | |
|---|---|---|---|---|
| 8,600,575 | B2* | 12/2013 | Weston | G06F 11/3006 |
| | | | | 700/286 |
| 8,948,781 | B2* | 2/2015 | Wang | G01S 19/34 |
| | | | | 455/456.1 |
| 9,763,188 | B2* | 9/2017 | Amorim de Faria Cardote | |
| | | | | H04L 67/12 |
| 9,986,503 | B1* | 5/2018 | Amorim de Faria Cardote | |
| | | | | H04L 67/12 |
| 2013/0061072 | A1* | 3/2013 | Wong | G06F 1/3209 |
| | | | | 713/320 |
| 2014/0359331 | A1* | 12/2014 | Kuan | G06F 1/263 |
| | | | | 713/323 |
| 2014/0370941 | A1* | 12/2014 | Wadman | H04W 52/0235 |
| | | | | 455/574 |
| 2016/0128043 | A1* | 5/2016 | Shuman | H04W 72/044 |
| | | | | 370/331 |
| 2016/0150072 | A1* | 5/2016 | Rangarajan | H04W 52/0254 |
| | | | | 455/574 |

* cited by examiner

SYSTEMS AND METHODS FOR POWER MANAGEMENT IN A NETWORK OF MOVING THINGS, FOR EXAMPLE INCLUDING A NETWORK OF AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/295,602, filed on Feb. 16, 2016, and titled "Systems and Methods for Power Management in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
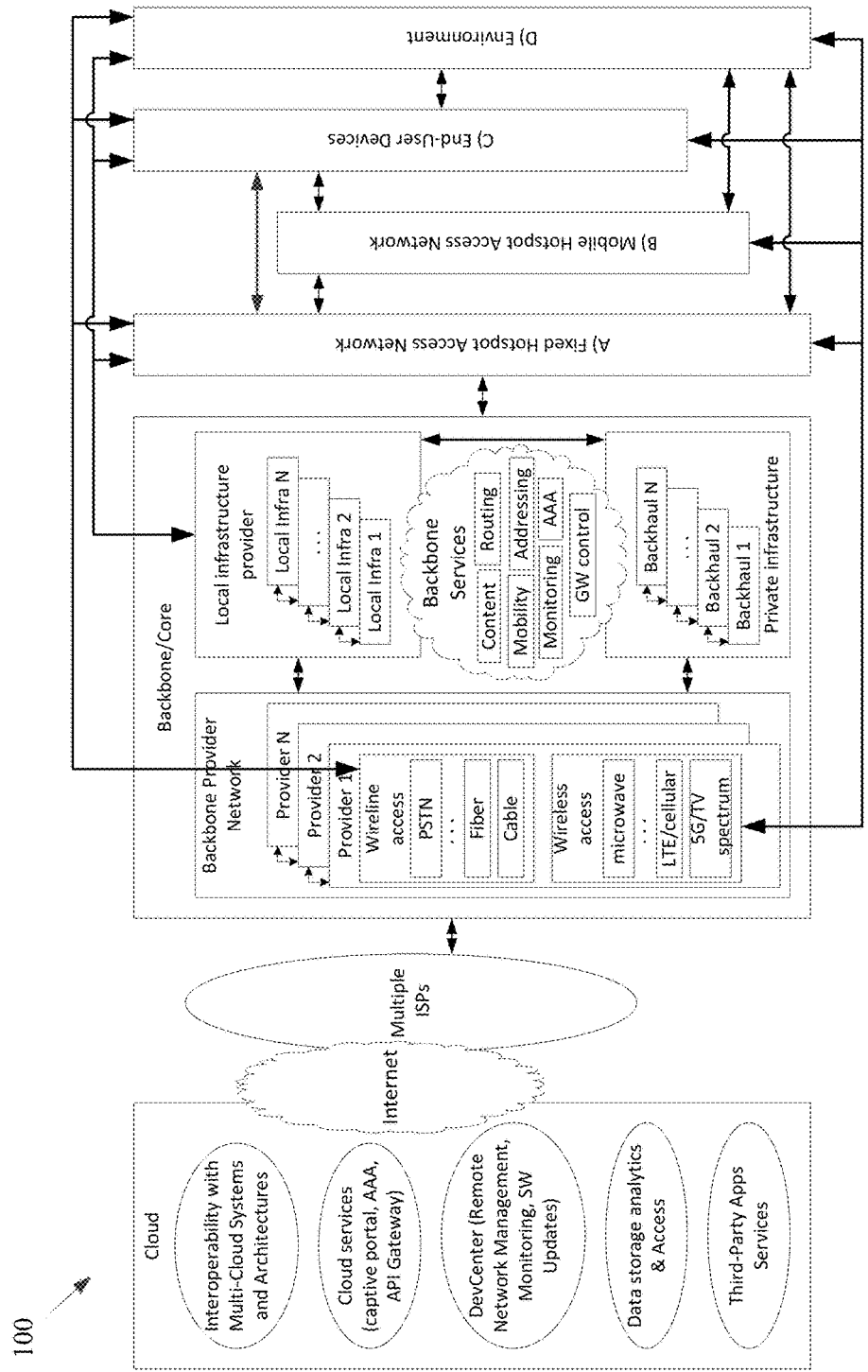
FIG. 1 shows a block diagram of a communication network, in accordance with various aspects of this disclosure.

Various aspects of this disclosure provide systems and methods for power management in a network of moving things. As non-limiting examples, various aspects of this disclosure provide systems and methods for utilizing information from various sensors and/or other information sources to determine when and/or how to operate a node (e.g., a Mobile AP, Fixed AP, etc.) in a power saving mode.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.).

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
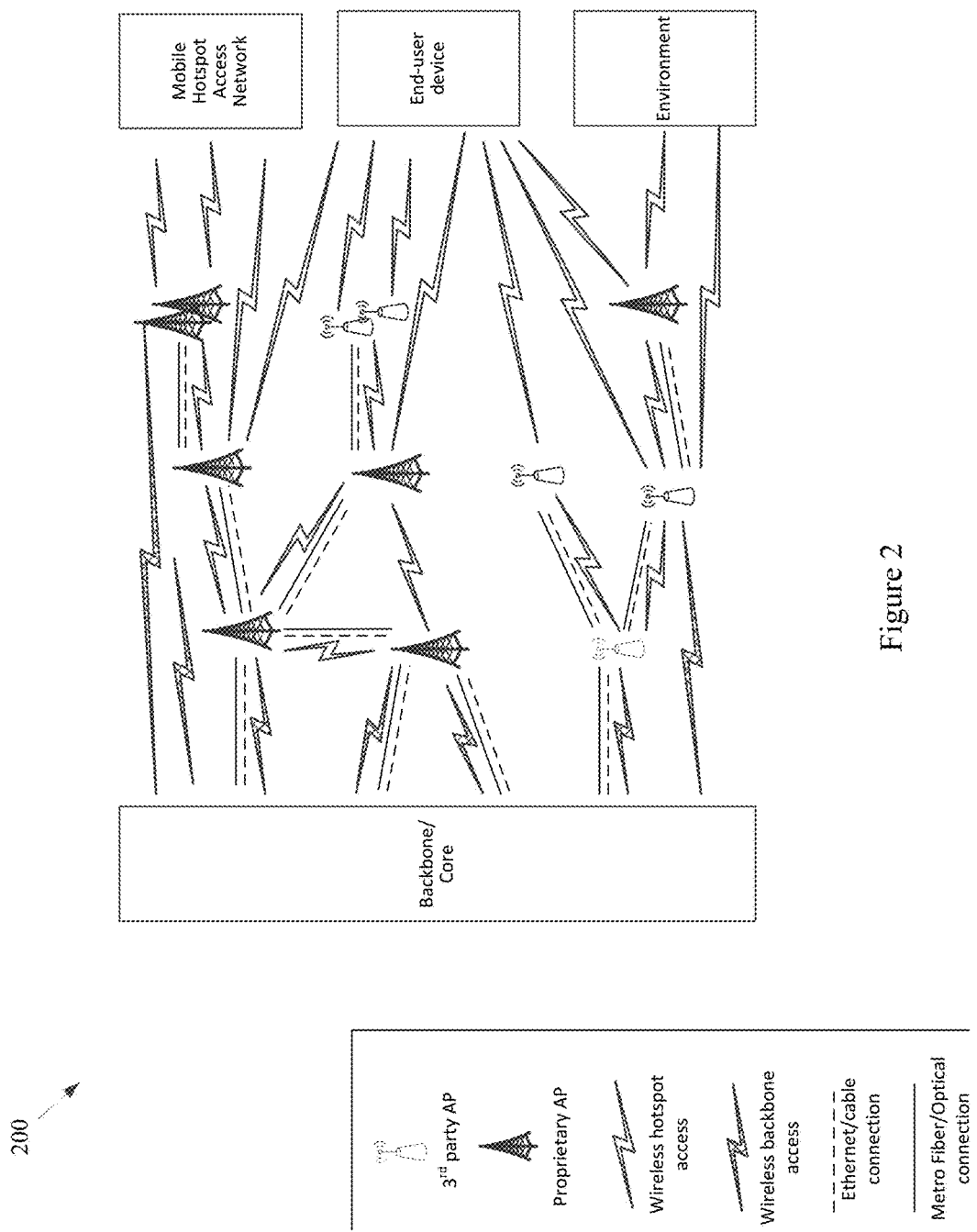
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
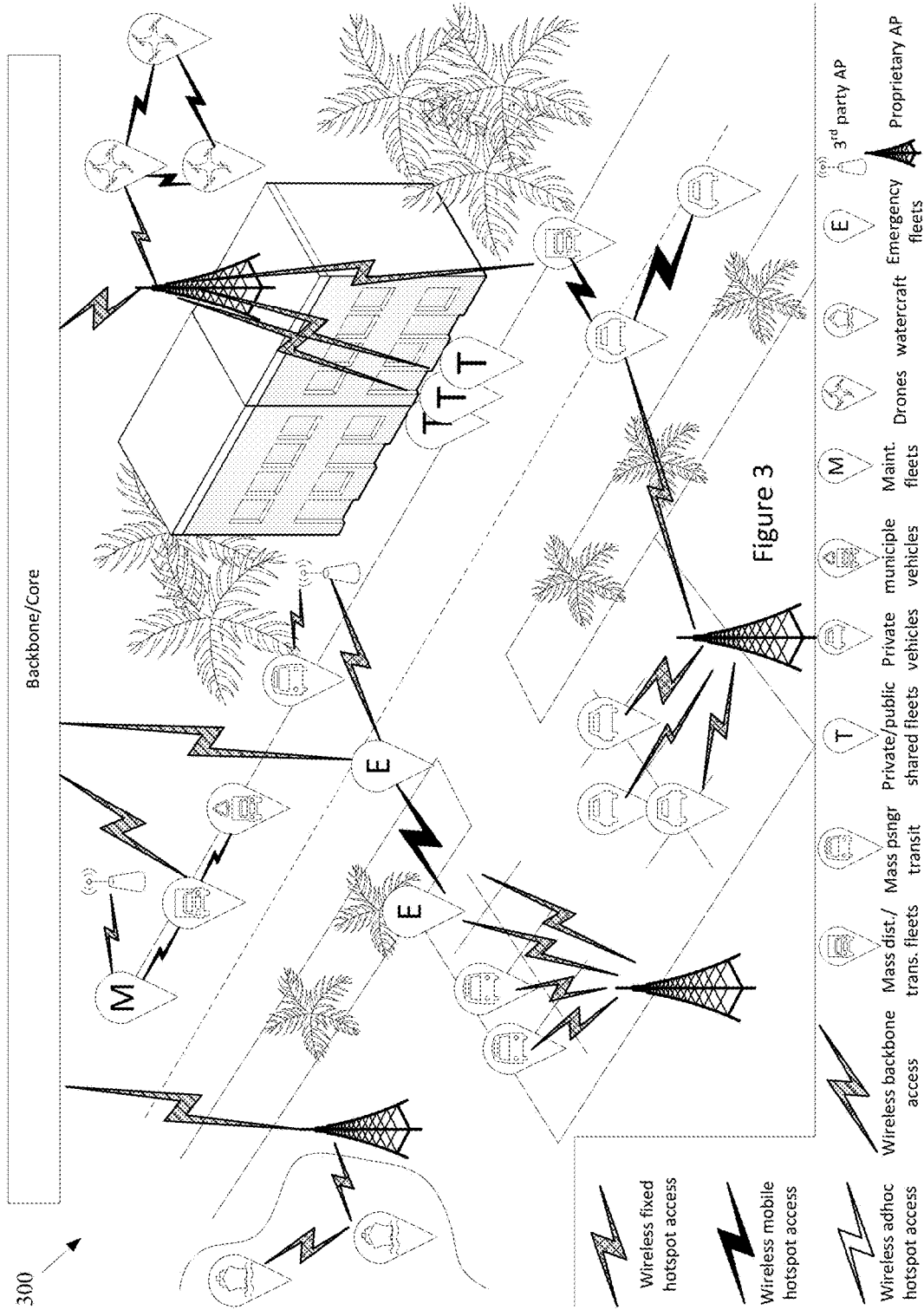
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
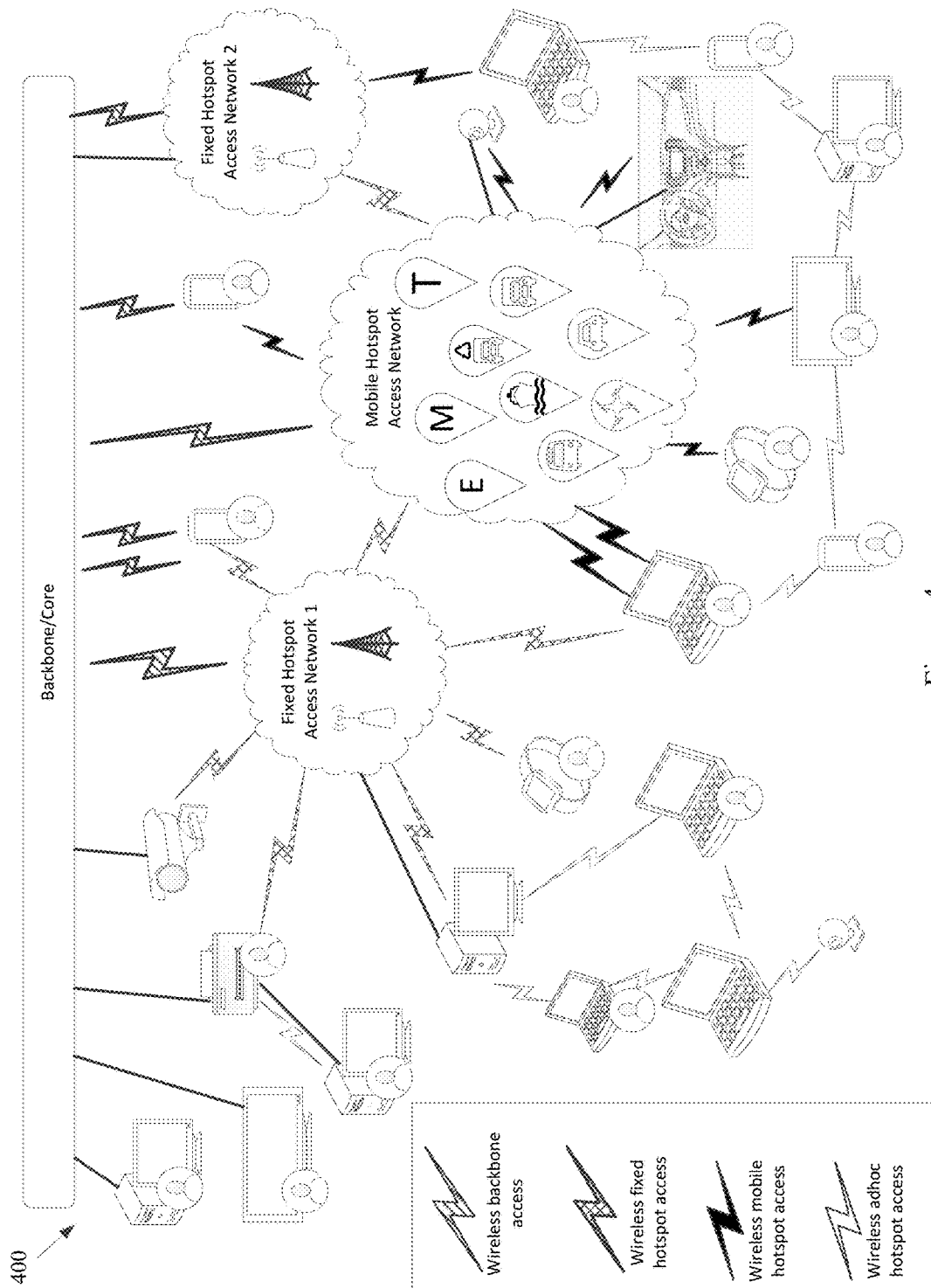
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
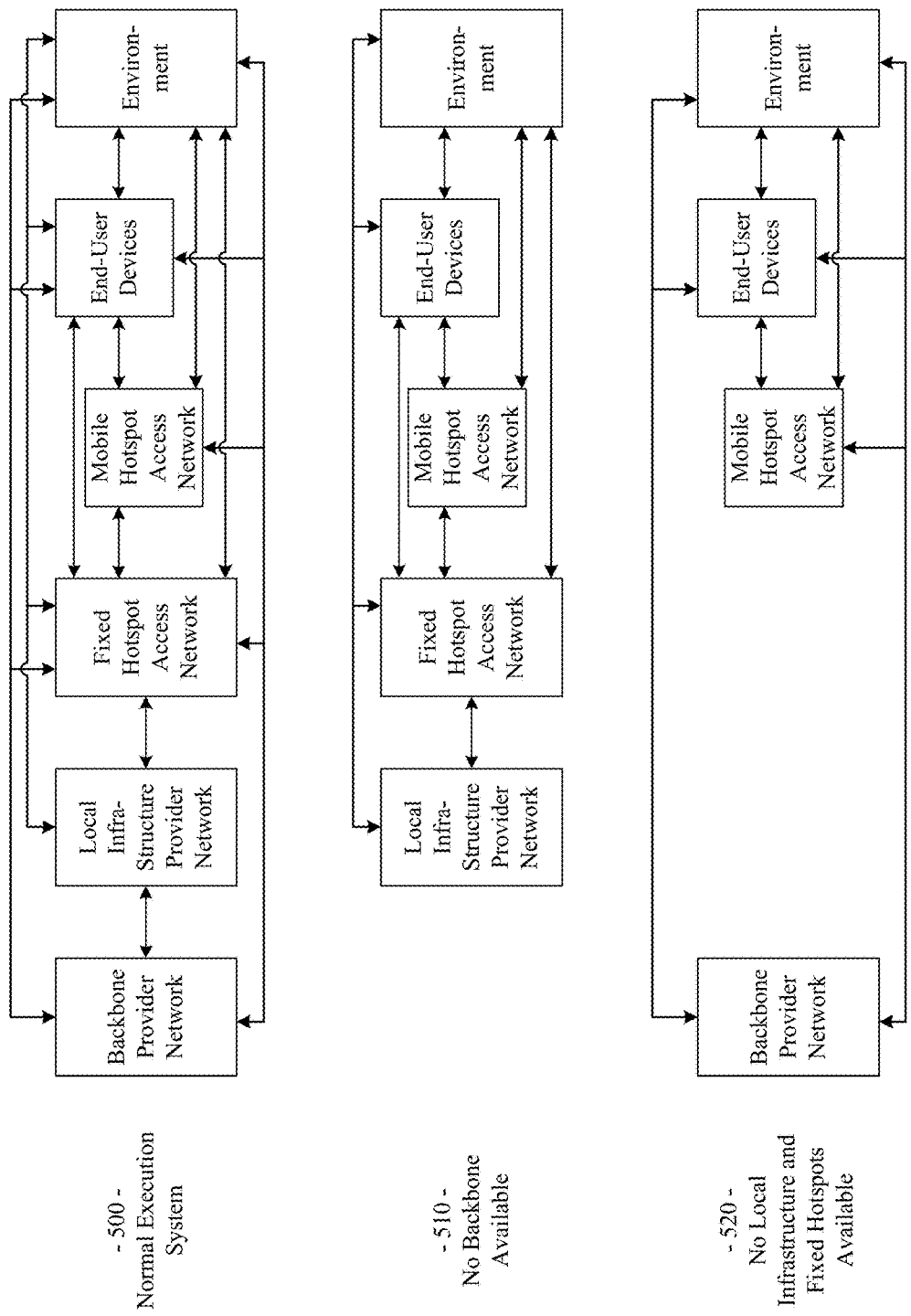
FIGS. 5A-5C show a plurality of network configurations illustrating the flexibility and/or and resiliency of a communication network, in accordance with various aspects of this disclosure.
Figure 5B:
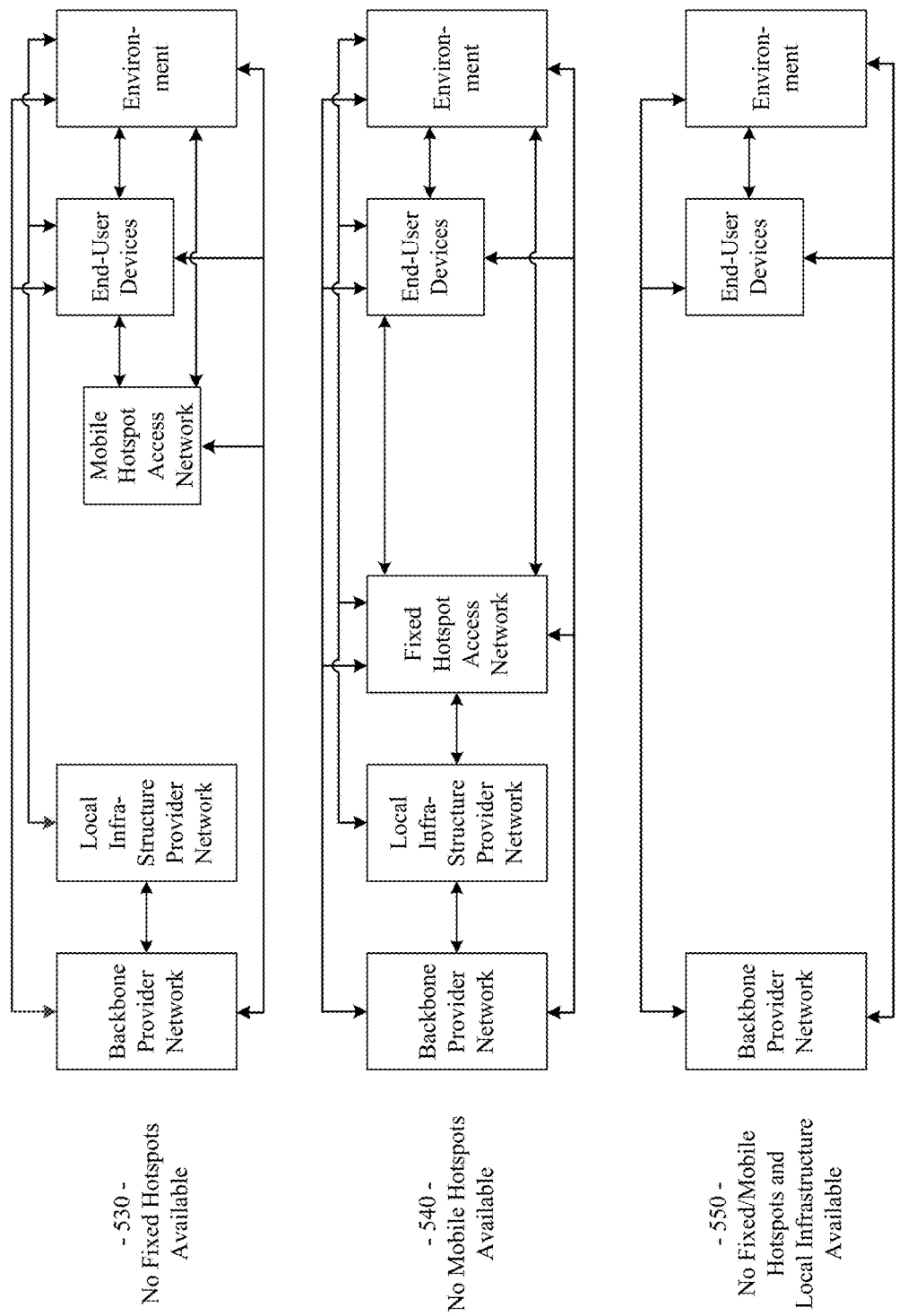
Figure 5C:
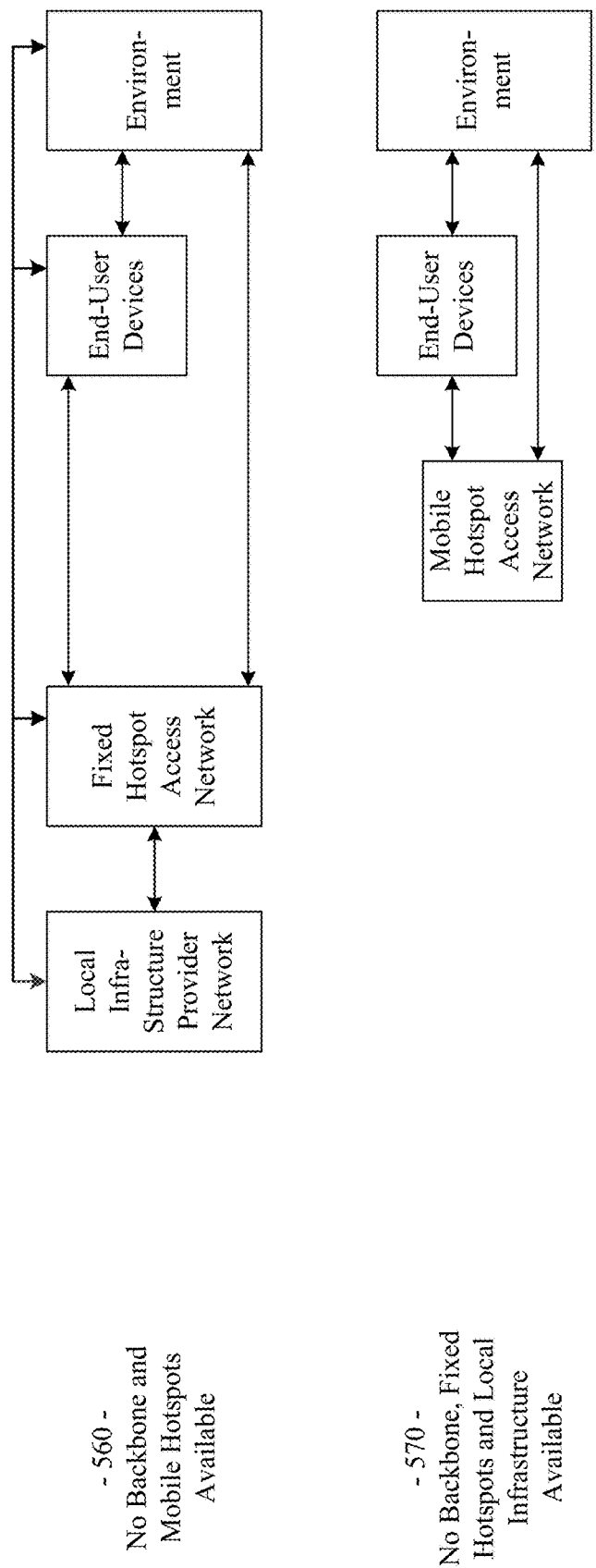

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.).

For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
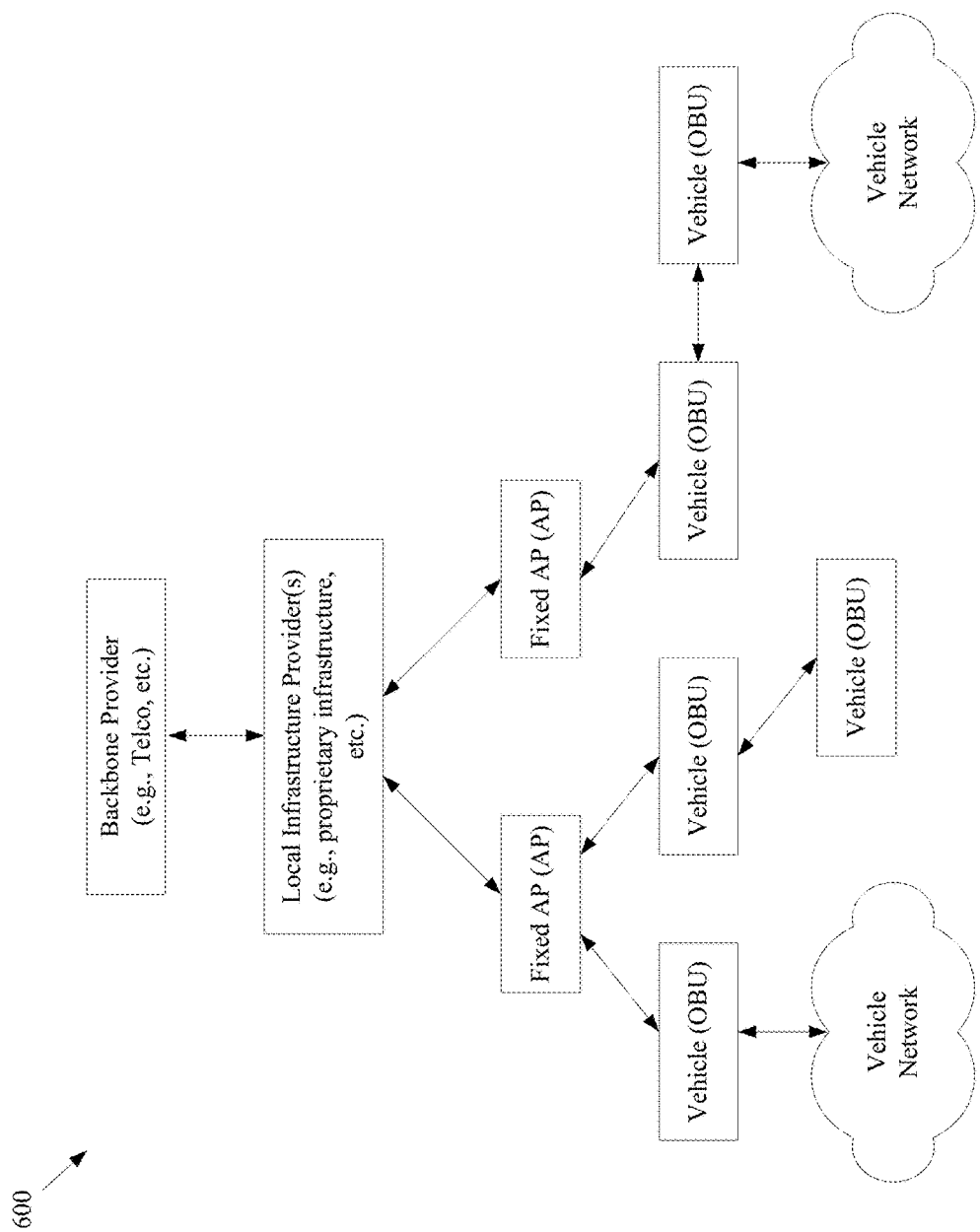
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Reducing energy utilization in network nodes (e.g., in mobile and fixed access points that utilize battery power) reduces costs, for example in direct energy costs (e.g., electricity cost, fuel cost, etc.), battery replacement and disposal costs, etc. In an example scenario involving a Mobile AP (or MAP) operating onboard a vehicle (e.g., a car, taxi, truck, autonomous vehicle, etc.), a substantial or total depletion of the vehicle battery may render the vehicle unable to start or otherwise operate as desired. In an example scenario involving a MAP in a vehicle whose engine is not running, or a Fixed AP (or FAP) operating only on battery power, a substantial or total depletion of the battery may also render the access point, and in the case of a MAP, the vehicle carrying the MAP, inoperable. The allowable power consumption of network nodes installed in electric vehicles may be orders of magnitude smaller than those of other forms of transportation (e.g., vehicles that are petroleum/natural gas powered such as automobiles, taxis, trucks, vans, buses, some autonomous vehicles, etc.). In addition, as more sensors, capabilities, etc., are added to network nodes, power consumption rises to a point at which it becomes a significant issue. Further, because the electronic components of the network nodes (e.g., MAPs, FAPs, NCs, etc.) typically generate heat, such a heat load must also be managed by the network node, and such management may impart additional demands on a battery-based power supply system (e.g., active cooling). Such management may include, for example, trading off power usage by various power consuming components against one another including, for example, computing resources, transmit power of radio frequency transmitters, the number of transmitters in use, and flexibility of operation (e.g., the ability to operate in all situations and to provide all services). This approach may enable the network node to continue operating in a manner that enables it to best meet network performance requirements/goals (e.g., service level agreements of clients/customers). For example, some radio frequency communication technologies (e.g., DSRC) may consume significant amounts of power during operation, and may be disabled in areas where coverage is poor/non-existent, or when the vehicle in which a DSRC-equipped network node is stopped and/or not involved in the communication of data. In addition, some network node sensors such as, for example, GNSS/GPS receivers may have integrated temperature control systems that consume significant power when in operation. Such sensors, or any other sensors, may be powered down and/or disabled from operation when not needed, to conserve power.

Smart energy management provides other benefits in addition to cost. For example, smart energy management in a vehicle network (e.g., a vehicle mesh network that may include FAPs and/or MAPs) enhances the survivability and extends the availability of the vehicle network in the event of a general power failure (e.g., a metropolitan area or portion thereof, neighborhood, campus, building, office, enterprise location, etc.). Accordingly, various aspects of this disclosure provide methods and systems for managing power in a network of moving things.

For example, various aspects of this disclosure provide for efficient energy utilization in a network node (e.g., a Mobile AP, Fixed AP, etc.) by, among other things, utilizing information from different sources (e.g., sensors external to the node, sensors within the node, information from peer nodes, information from parent nodes, information from cloud-based applications, etc.) to intelligently determine when to operate the node in a power saving mode and to select a power saving mode (or characteristics thereof) in which to operate the node.

Also for example, various aspects of this disclosure provide systems and methods that are flexibly adaptable to different types of nodes (e.g., MAPs, FAPs, NCs, etc.) and/or different types of vehicles that may be carrying the node. For example, nodes operating onboard different types of vehicles (e.g., aerial, terrestrial, underground, waterborne, autonomous, and subcategories thereof, etc.) may utilize different respective power saving modes and/or conditions for entering and/or leaving such modes.

Additionally for example, various aspects of this disclosure provide methods that are flexibly adaptable to different contexts in which a node and/or vehicle carrying the node may be operating.

Further for example, various aspects of this disclosure provide for changing the configuration modes of vehicles (or vehicle nodes), providing for a smooth transition and/or graceful shutdown of the applications, protocols, and/or services running on top of a node (e.g., Mobile AP, Fixed AP, Network Controller, etc.) that is deployed over the vehicle network (e.g., locally, near the vehicle location, along a particular fleet or city, etc.).

Still further for example, various aspects of this disclosure provide for deployment of a system that is suitable to power a survivable network, for example by leveraging the power-providing capabilities of large vehicle batteries. Such a system may, for example, be deployed in a city (or portion thereof) when no energy is available (e.g., no energy is available from the traditional power grid).

Figure 7:
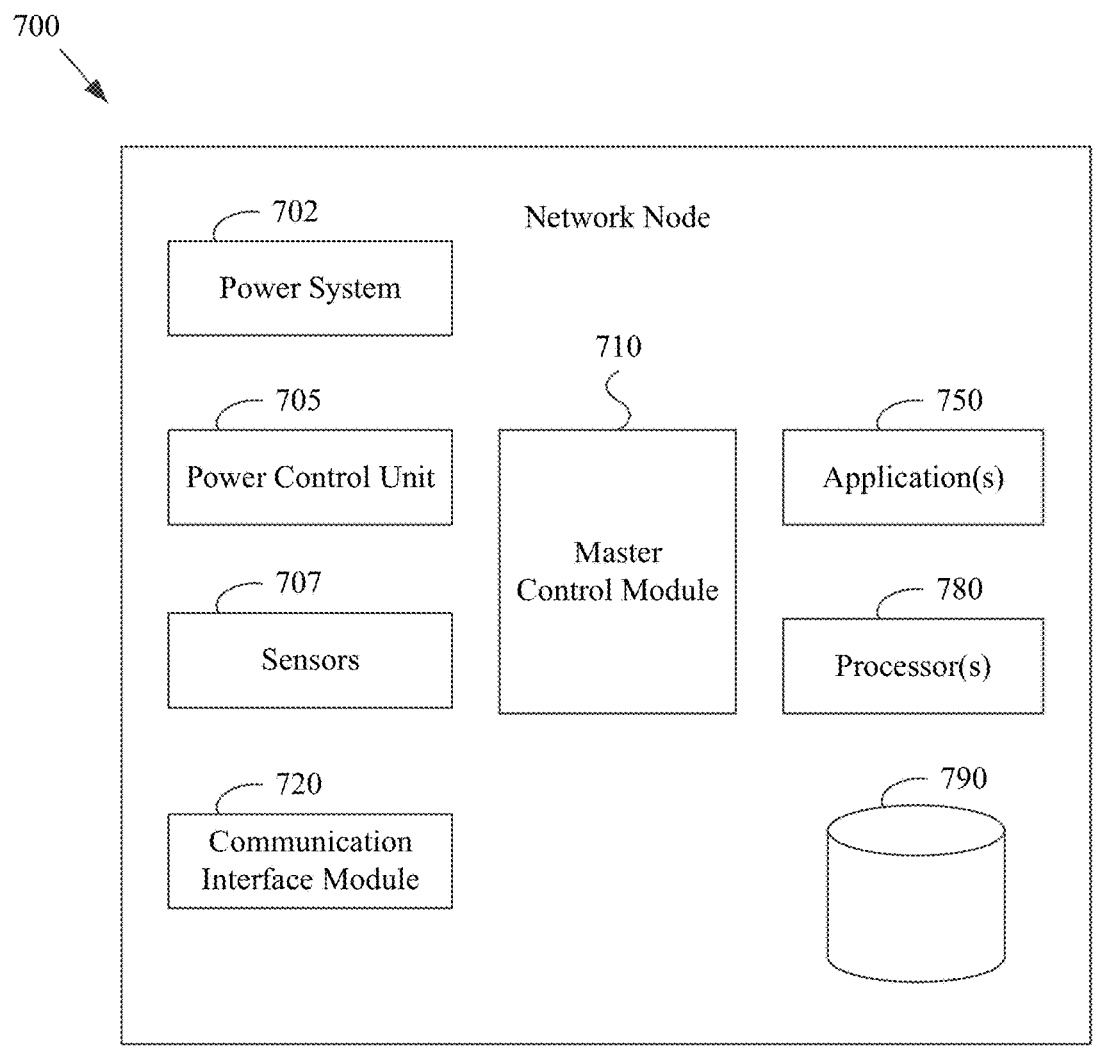
FIG. 7 shows a block diagram of various components of an example network node, in accordance with various aspects of the present disclosure.

FIG. 7 shows a block diagram of various components of an example network node, in accordance with various aspects of the present disclosure. The example node 700 may, for example, share any or all characteristics with the other example methods, networks, and/or network components 100, 200, 300, 400, 500-570, 600, 800, 900, and 1000 discussed herein. For example, any or all of the components of the example node 700 may perform any or all of the method steps presented herein.

The network node 700 may, for example, comprise an access point (AP) node (e.g., a Mobile AP, a Fixed AP, etc.). The example node 700 will be referred to herein as an access point (AP), but the scope of this disclosure is not limited thereto. The example AP 700 (e.g., a Mobile AP (MAP), a Fixed AP (FAP), etc.) may comprise a variety of components (or modules), non-limiting examples of which are provided herein.

The example AP 700 may, for example, comprise a communication interface module 720 that operates to perform any or all of the wireless and/or wired communication functionality for the node 700, many examples of which are provided herein (e.g., communication with sensors external to the AP 700, communication with the onboard diagnostic (OBD) system of a vehicle in which the AP 700 is installed, communication with peer APs, communication between Mobile APs and Fixed APs, communication with MCs (e.g., NCs), communication with client devices, backhaul communication, Cloud server communication, etc.). The communication interface (I/F) module 720 may, for example, operate in accordance with any of a variety of cellular communication protocols, 3G, 4G, wireless LAN communication protocols (e.g., IEEE 802.11a/b/g/n/ac/af (Wi-Fi), etc.), wireless personal area network (WPAN) communication protocols (e.g., Bluetooth®, etc.), IEEE 802.11p or Direct Short Range Communication (DSRC) protocols, satellite communication protocols, fiber or cable communication protocols, local area network (LAN) protocols (e.g., IEEE 802.3 (Ethernet), etc.), Transmission Control Protocol (TCP), Internet Protocol (IP), etc.

The example AP 700 may, for example, comprise a Power System 702 that operates to provide electrical power to the AP 700. For example, the Power System 702 may comprise a battery unit, a battery charger, an interface for an external battery, an interface for one or more external power sources, etc. The Power System 702 may, for example, comprise any of a variety of different types of voltage and/or current regulators, converters, inverters, filters, etc. The Power System 702 may also, for example, comprise hardware and/or software that operate to control various aspects of power provided to the AP 700.

The example AP 700 may, for example, comprise a Power Control Unit 705 that operates to control electrical power provided to the AP 700. The Power Control Unit 705 may, for example, comprise hardware and/or software that operate to implement any or all of the power control and/or power-save functionality discussed herein.

The Power Control Unit 705 may, for example, operate to manage the power delivered to and/or utilized by the AP 700 by adapting the amount of power delivered to (or utilized by) the AP 700 based, at least in part, on the context/environment in which the AP 700 is operating.

For example, the Power Control Unit 705 may base its operation, at least in part, on the analysis of metrics or measurements that trigger or influence actions or modes of operation that operate to conserve energy. Many examples of such metrics, acquiring information of such metrics, analyzing such metrics to determine an operating mode, etc., are provided herein. Such metrics or measurements may be related to factors external to the AP 700, for example, events or conditions reported by sensors, notifications from other nearby vehicles (or Mobile APs thereof), Fixed APs, Cloud servers or applications, client devices, etc. Analysis of such metrics may, for example, result in transitions between operating modes (at least some of which are power saving modes), tuning operation within a particular operating mode, etc.

The Example AP 700 may, for example, comprise one or more sensors 707 and/or interfaces thereto. As discussed herein, any one or more of a variety of different types of sensors may be utilized to provide information utilized by the Power Control Unit 705 in determining operating mode characteristics. The previous examples presented herein and the following examples will provide many examples of such sensors. It should be understood, however, that the scope of this disclosure is not limited to the specific examples provided herein.

The example AP 700 may, for example, comprise a Master Control Module 710 that generally manages operation of the node 700 at a high level. Such Master Control Module 710 may, for example, comprise various aspects of an operating system for the AP 700.

The example AP 700 may further, for example, comprise one or more software/firmware applications 750 executing on the AP 700 (e.g., client management applications, security applications, power management applications, vehicle monitoring applications, location services applications, sensor interface applications, etc.).

The example AP 700 may also comprise one or more processors 780 and memory devices 790. The processor(s) 780 may, for example, comprise any of a variety of processor characteristics. For example, the processor(s) 780 may comprise one or more of a general purpose processor, reduced instruction set (RIS) processor, microcontroller, microprocessor, application-specific integrated circuit (ASIC), digital signal processor (DSP), video processor, graphics processing unit (GPU) etc.). The memory device(s) 790 may, for example comprise any of a variety of memory characteristics. For example, the memory device(s) 790 may comprise a volatile memory, non-volatile memory, etc. The memory device(s) 790 may, for example, comprise a non-transitory computer-readable medium that comprises software instructions that when executed by the processor(s) 780, cause the node 700 to perform any or all of the functionality discussed herein (e.g., with regard to the example methods discussed herein, etc.).

As discussed herein, the Power Control Unit 705 (or any hardware and/or software module of the AP 700) may operate the AP 700 in any of a variety of operating modes, non-limiting examples of which are provided herein. For example, such operating modes may comprise a normal operating mode, one or more power saving modes, and turned-off mode.

In an example normal operating mode, the components (e.g., hardware components) of the device are powered-up and operating normally. Note, however, that the definition of normal operating mode may vary according to various factors, such as the environment and/or type of vehicle carrying a Mobile AP. For example, the hardware (HW) components that should be powered and the software (SW) running on the AP may depend on the AP's context. As an example, in a Mobile AP installed in a bus and in a Mobile AP installed in a container (e.g., a shipping container, etc.) different hardware may be powered and/or different software may be utilized. For example, a wireless cellular connection may be implemented for the bus AP and a wireless cellular connection might not be implemented for the container AP. In such an example scenario, even though the AP of the container might have one or more hardware components that perform wireless cellular communication, such components might not be powered during normal operation. In the bus AP context, however, the same components may be powered during normal operation.

In an example turned-off mode the AP (or other node) is not powered and is out of operation. Depending on the implementation, however, there still may be a very small amount of power provided to a component capable of automatically transitioning the AP out of the turned-off mode. Also for example, a node may be in a turned-off mode when a hardware component is damaged, when a battery that has been providing power to the node dies, etc.

In general, there may be any number of power saving modes in an implementation. Various examples are presented herein for illustrative clarity, but the scope of this disclosure is not limited to any particular number of power saving modes. In an example implementation the power saving mode may be subdivided into three different power saving modes, for example a Sleep Mode, a SW Power Saving Mode, and a Low Clock Mode.

In a Sleep Mode, for example, only an accelerometer and a data processing unit may be powered up, and the data processing unit may be in a low-power mode (e.g., reduced clock frequency, some peripheral devices turned off/powered down). This mode may, for example, be used in situations in which the AP has not been used for a long period of time (and/or it is not planned or anticipated to be used for a long period of time), and therefore, higher energy savings are desired.

In SW Power Saving Mode, some of the applications running in the software/firmware of the AP (e.g., a Mobile AP, etc.) are stopped. In this mode the HW system generally remains in normal operation, while some SW applications are stopped because they are at least temporarily not being used. For example, such stopped SW applications might not be intended for utilization in a particular environment in which a vehicle carrying a Mobile AP is operating. Note that in some cases the shutting down of a SW application may result in the turning-off of various HW components, for example those HW components utilized only by the SW application or utilized by multiple SW applications that have all been shut down.

In Low Clock Mode, generally only the sensors (or other information gathering components) reduce their energy consumption by reducing the sampling rate. For example, in a context in which the sensed information is only changing and/or expected to change slowly, the frequency at which such a sensor is utilized to provide the sensed information may be reduced, thus conserving energy.

Note that any of the modes discussed herein may be configurable Such configuration may be performed at the time of manufacture of the AP/node 700, at the time of installation in a particular environment, in response to real-time operating conditions, etc. For example, time periods may be adjusted, wake-up or mode-changing requirements may be modified, clock speeds may be adjusted, particular HW and/or SW components to be shut down in particular contexts may be modified, etc.).

Additionally, new modes may be provided and/or existing modes may be modified as power sources change. For example, shared power between vehicles, solar panels, wind power, may cause the Power Control Unit 705 to adjust the manner in which power-save decisions are made.

Figure 8:
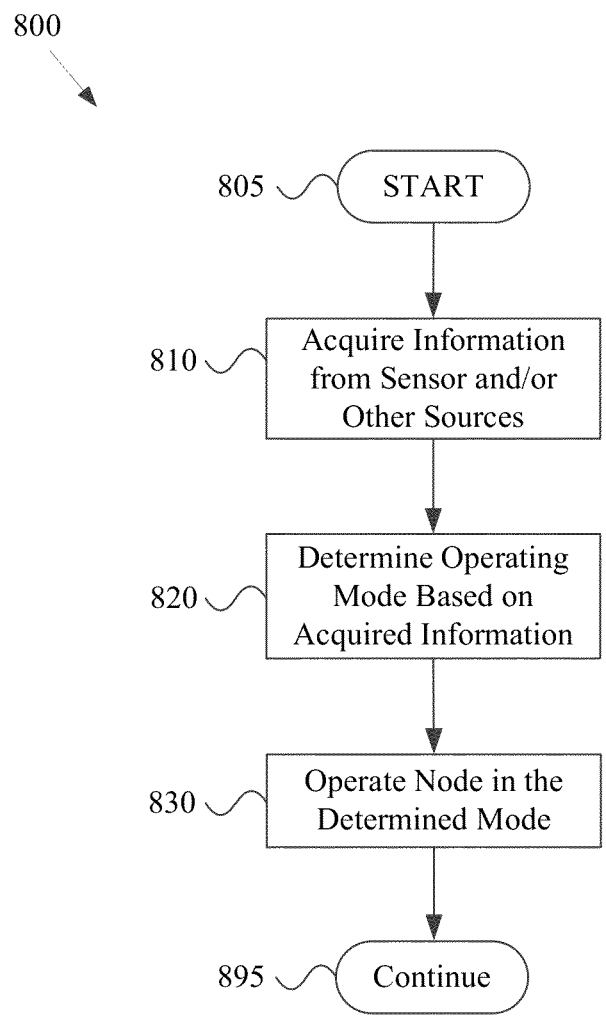
FIG. 8 shows a flow diagram of an example method of managing power, in accordance with various aspects of the present disclosure.

FIG. 8 shows a flow diagram of an example method 800 of managing power, in accordance with various aspects of the present disclosure. The example method 800 may, for example, share any or all characteristics with the other example methods, networks, and/or network components 100, 200, 300, 400, 500-570, 600, 700, 900, and 1000 discussed herein. For example, any or all functions discussed with regard to the example method 800 may be implemented by one or more of the network nodes discussed herein. For example, the example method 800, or any portion thereof, may be implemented by the Power Control Unit 705 of the example node 700 of FIG. 7.

The example method 800 begins executing at block 805. The example method 800 may begin executing in response to any of a variety of causes or conditions, non-limiting examples of which are presented herein.

For example, the example method 800 may generally continually execute, for example in response to powering up, rebooting, or resetting one or more nodes of the network. Also for example, the example method 800 may begin executing in response to a user command (e.g., an end-user request, a command from network management personnel, a service provider request, a fleet manager request, etc.). Additionally for example, the example method 800 may begin executing in response to one or more metric measurements performed automatically by the system (e.g., power supply measurements, vehicle context measurement, power utilization measurements, node or path throughput measurements, error rate measurements, user count or loading measurements, node-generated error or warning messages, information received from a public service node (e.g., public service announcements, warning and alerts, etc.), etc. Also for example, the example method 800 may be initiated periodically (e.g., at timed intervals, consistent and/or inconsistent timed intervals, etc.). In general, the example method 800 may execute in response to any of a variety of causes or conditions. Accordingly, the scope of this disclosure should not be limited by characteristics of any particular cause or condition.

The example method 800 may, at block 810, comprise acquiring information from one or more sensors, from one or more other network nodes, etc. Block 810 may comprise acquiring such information in any of a variety of manners, non-limiting examples of which are provided herein.

For example, block 810 may comprise acquiring information from one or more sensor sources. Such sensor sources may, for example, be local sensors within the node (e.g., within the Mobile AP, within the Fixed AP, etc.), for example an accelerometer, a temperature sensor, a battery monitor, a moisture sensor, a gyroscope, a microphone, a gas particle sensor, a radio-frequency (RF) energy sensor, any of the sensors discussed herein, etc.

Also for example, such sensors may be sensors external to the node (e.g., external to the node chassis, etc.). For example any of the sensors discussed herein may be external to the node. Such information acquisition may, for example, comprise acquiring information from sensors that are external to the node and local to a vehicle in which the node is installed (e.g., any of the sensors discussed herein, etc.). For example, block 810 may comprise communicating with a network of the vehicle (e.g., an OnBoard Diagnostic (OBD) System, a Control Area Network (CAN), a navigation system, an environmental control system of a vehicle, system(s) of an autonomous vehicle, etc.) to obtain information regarding vehicle performance, vehicle context, environmental conditions, engine state, vehicle location, vehicle motion, fuel on-board, etc. Such sensors may be external to the node and also external to a vehicle in which the node is installed. For example, block 810 may comprise receiving sensor information from a sensor system passed by a vehicle carrying the node (e.g., any of the sensors discussed herein, etc.). Note that sensor information may also be acquired by any of the other network nodes and communicated to the node.

Block 810 may comprise acquiring information (e.g., vehicle information, context information, network information, sensor information, operating instruction information, etc.) from other nodes in the vehicle network (or other networks coupled thereto). For example, block 810 may comprise receiving the information from peer nodes and/or parent nodes, from Cloud nodes (e.g., network control applications/servers, service provider applications/servers, public service applications/servers (e.g., emergency information, power outage information, weather information, traffic information, disaster information, scheduling information for public transportation, etc.), from client devices, etc.).

Block 810 may comprise acquiring the information in a passive and/or active manner. For example, block 810 may comprise passively receiving information from sensors (or sensor modules or systems) and/or other nodes without specifically requesting such information. In an example implementation, various sensors or other sources may communicate their respective information completely under their own control, in accordance with a configuration that dictates when the information is to be communicated (e.g., periodically, in response to a detected condition, etc.), etc. Note that the node itself may perform the configuration of sensors. Also for example, block 810 may comprise receiving such information from other source nodes (e.g., peer nodes, parent nodes, Cloud nodes, client nodes, etc.) whenever such source nodes happen to send such information (e.g., in an unsolicited manner).

Additionally, block 810 may comprise actively acquiring the information (e.g., instead of or in addition to passively acquiring the information). For example, block 810 may comprise polling sensors (or sensor modules or systems) when the node desires such information. Block 810 may, for example, comprise sending an inquiry message to an information source when information is desired. In various example scenarios, another block of the example method 800 (e.g., the mode determining block 820) may determine that additional information (e.g., from an additional or back-up source) is desired to verify a decision, to confirm a detected condition or verify received information, etc. The node may then solicit the source of the additional information.

Block 810 may comprise acquiring the information only when needed, periodically, on a set time schedule, when a particular condition or event is detected or suspected, anticipated, etc. For example, when an unexpected or unlikely condition is detected, block 810 may comprise acquiring additional information to confirm or understand the detected condition.

Block 810 may also, for example, comprise acquiring information from redundant sources, either of the same type of source (or sensor) or different type of source. For example, block 810 may comprise acquiring motion and/or geographic location information, environmental information, emergency information, etc., from multiple sources. For example movement information may be obtained from an accelerometer, from vehicle sensors (e.g., wheel rotation sensors, transmission sensors), from a satellite-based positioning system (e.g., Global Navigation Satellite System (GNSS)/Global Positioning System (GPS), from a changing wireless signal profile, etc.

As discussed herein, various different types of information may be combined taking into consideration the vehicle's context (e.g., geographic location, type of road (e.g., local streets, interstate highway), number of vehicles nearby, proximity to a Fixed AP, vehicle condition, etc.), in order to decide on whether and/or how to switch between different operating modes (e.g., including determining the power saving mode in which to operate). Many illustrative examples regarding the applicability and origin of different types of information are provided herein.

Figure 9:
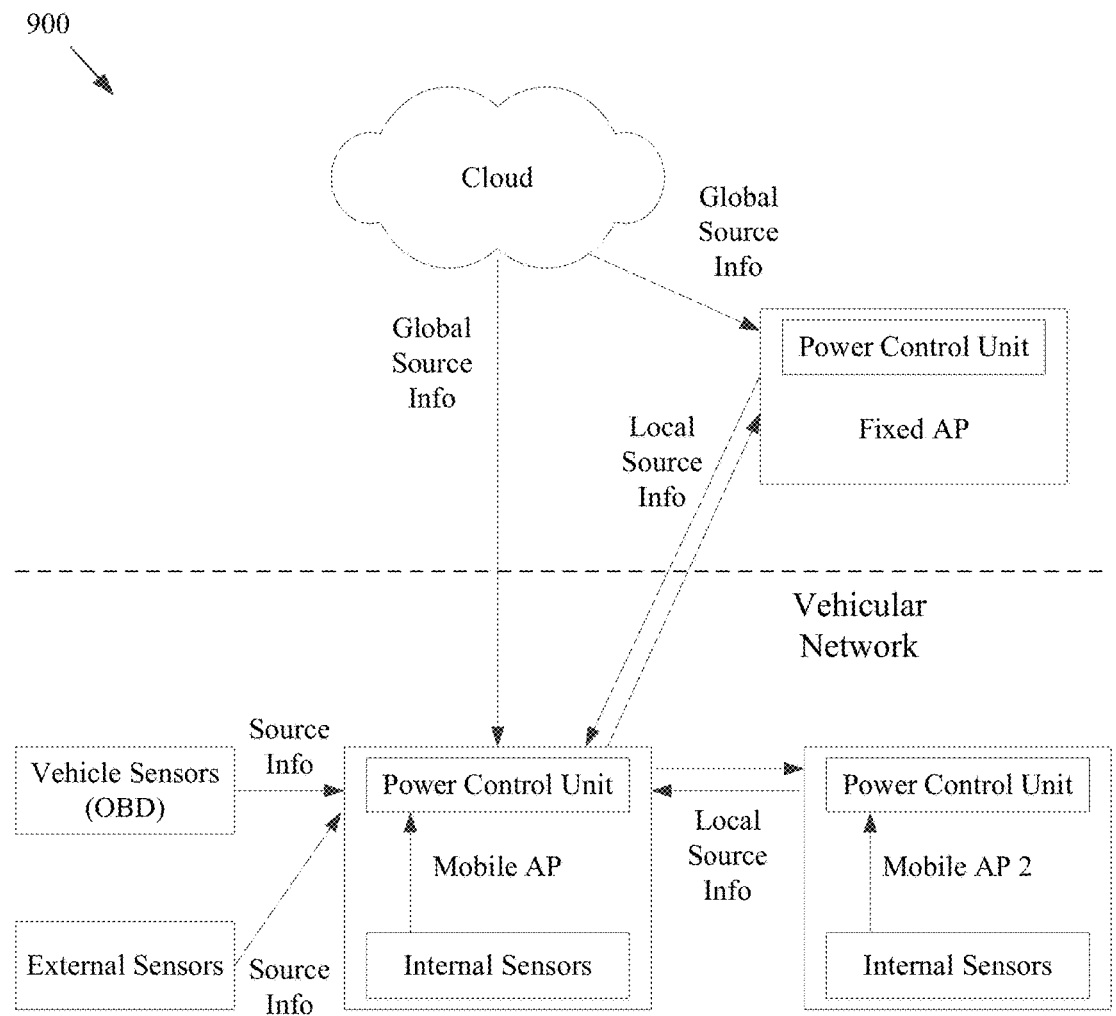
FIG. 9 is provided as an illustrative example of various information sources and/or information pathways that may be utilized.

FIG. 9 is provided as an illustrative example of various information sources and/or information pathways that may be utilized. Referring temporarily to FIG. 9, the Mobile AP (e.g., Power Control Unit thereof) may, for example, receive source information from internal sensors, vehicle sensors, sensors external to the Mobile AP and external to the vehicle, etc. Also for example, the Mobile AP (e.g., Power Control Unit thereof) may receive local source information from (and/or provide local source information to) other Mobile APs and/or Fixed APs. Additionally for example, the Mobile AP (e.g., Power Control Unit thereof) may receive global source information from nodes (e.g., servers/applications) of the Cloud (e.g., the Internet, other public and/or proprietary networks, etc.). The example Mobile APs, Fixed AP, and Cloud may, for example, share any or all characteristics with any or all of the Mobile APs, Fixed APs, and Clouds presented herein.

In general, block 810 comprises acquiring information from one or more sensors, from one or more other network nodes, etc. Accordingly, the scope of this disclosure should not be limited by characteristics of any particular information source and/or of any particular manner of acquiring the information from the source.

The example method 800 may, at block 820, comprise determining an operating mode for the node (e.g., a Mobile AP, Fixed AP, etc.) based, at least in part, on the information acquired at block 810. Block 820 may comprise determining the operating mode in any of a variety of manners, non-limiting examples of which are provided herein.

For example, block 820 may comprise performing such determining in response to any of a variety of causes or conditions. For example, block 820 may comprise performing such determining periodically (e.g., at a set period), whenever a complete set of information has been acquired or enough information has been gathered to perform the determination, whenever new relevant information is acquired, whenever a change in operating mode is expected (e.g., based on historical operation, based on time of day, based on day of week, based on location, etc.), when a substantial change in a metric is detected, in response to a message received from another node, in response to a command received from a network and/or service controller, in response to an emergency condition, etc.

Note that block 820 may be implemented generally in a single node, but may also be implemented in a distributed manner. For example, block 820 may comprise communicating with and/or obtaining permission from a network controller or service provider controller before finalizing a decision to enter and/or exit from a particular operating mode. For example, in an example scenario in which block 820 determined to enter a particular power saving mode, block 820 may solicit permission from a network controller in the Cloud. Block 820 may also, for example, notify the network controller of the change of operating mode with or without seeking permission. Similarly, block 820 may also advertise an operating mode change to other nearby nodes (e.g., peer nodes, parent node, client devices, etc.).

Block 820 may, for example, vary for a Mobile AP in accordance with type of vehicle in which the Mobile AP is installed (or for a Fixed AP in accordance with the general context in which it operates). For example, as will be seen herein, block 820 may operate differently for a boat than for a bus, a taxi, a waste management vehicle, a subway train, an autonomous vehicle, etc.

Block 820 may also, for example, vary based on power source type (e.g., battery or type thereof, external power source or type thereof, etc.). For example, energy conservation may be important, but less critical, when a node is receiving ample power from a renewable or clean energy source than when receiving power from an internal combustion engine. Also for example, energy conservation may be important, but less critical, when a battery with a large reserve of energy is being utilized relative to a battery with a relatively small reserve of energy.

Numerous examples of the block 810 information acquiring and block 820 determining are presented herein in the example scenarios. It should be understood that the scope of this disclosure is not limited to the specific characteristics of such examples, and that they are generally indicative of much broader scenarios.

In general, block 820 may comprise determining an operating mode for the node (e.g., a Mobile AP, Fixed AP, etc.) based, at least in part, on the information acquired at block 810. Accordingly, the scope of this disclosure should not be limited by characteristics of any particular manner of performing such determining.

The example method 800 may, at block 830, comprise operating the node in the operating mode determined at block 820. Block 830 may comprise performing such operating in any of a variety of manners, non-limiting examples of which are provided herein.

For example, block 830 may comprise managing the shutdown (and/or restart) of any of the SW or HW components affected by an operating mode change. For example, entry into a particular operating mode may be governed by an ordered set of operations to be performed to effect the change without issues.

The example method 800 may continue execution at block 895. Such continued execution may comprise any of a variety of characteristics. For example, block 895 may comprise returning execution flow to any previous block. Also for example, block 895 may comprise entering a wait loop to wait for stimulus causing the method 800 to begin again. Additionally for example, block 895 may comprise directing execution flow to any part of any other method discussed herein.

Various aspects of the present disclosure will now be presented by illustrative example. It should be understood that the scope of this disclosure should not be limited by specific characteristics of such examples.

In a first example implementation, a determination of whether to operate in a power saving mode and/or of the power saving mode in which to operate may be based, at least in part, on vehicle movement status. For example, if the vehicle carrying a Mobile AP is moving or it is stopped for less than a particular amount of time, the Mobile AP may be operated in the normal operating mode, and otherwise the Mobile AP may be operated in a power saving mode. Information regarding vehicle movement status may, for example, be provided by an accelerometer, by a vehicle system (e.g., an Engine Control Module (ECM), a system of an autonomous vehicle (e.g., a navigation system), or other system, or by wheel rotation or other sensors) and/or GNSS/GPS sensors/receiver(s)). For example, acceleration and/or coordinate information may be analyzed to detect motion and/or to determine an amount of motion. If, for example, the vehicle is stopped for a long period of time (e.g., meeting or exceeding a threshold, in comparison to a threshold, etc.), the Mobile AP (or other node) may enter into one of the power saving modes (e.g., the Sleep Mode).

In another example implementation, a determination of whether to operate a node in a power saving mode and/or of the power saving mode in which to operate may be based, at least in part, on vehicle speed (e.g., an automobile, taxi, truck, autonomous vehicle, or other vehicle carrying a Mobile AP). For example, if the vehicle's speed is below a particular threshold or is exactly zero for more than a particular amount of time, the node may be operated in a power saving mode. The power saving mode to which the device transitions may, for example, depend on whether the threshold value is different or equal to zero. For example, the complete absence of movement may cause a transition to the Sleep Mode, while slow movement may cause a transition to the SW Power Saving Mode or Low Clock Mode.

Note that information regarding both the vehicle movement status and/or the vehicle speed may, for example, be provided by the vehicle's OBD system or controller area network (CAN bus). Such information may be utilized as redundant information, for example for failover reasons, verification reasons, etc. For example, OBD and/or CAN bus information concerning vehicle speed may be used as a redundant mechanism to detect if the vehicle is stopped. Also for example, if the accelerometer fails to evaluate the acceleration correctly, the speed measured by the OBD system or information that is CAN bus accessible may be used to override the decision on whether to make a transition to Sleep Mode. Also for example, information indicating that the vehicle has stopped while the engine is on, or moving very slowly (e.g., in a traffic jam), may for example cause the node to be operated in the Low Clock Mode.

In another example implementation, a determination of whether to operate a node in a power saving mode and/or of the power saving mode in which to operate may be based, at least in part, on vehicle engine status. For example, if the engine is on and the vehicle is moving, the node may be operated in the normal operating mode, otherwise the node may be operated in a power saving mode (e.g., once the vehicle has been stopped and the engine has been off for a particular amount of time). The engine status may, for example, be provided by the OBD system of the vehicle, obtained from vibration and/or motion sensors, obtained from microphone sensors, obtained from gas and/or temperature sensors, obtained from sensors/systems accessible via a CAN bus, etc. The analysis of various sources of engine or other vehicle status information may, for example, be used as a redundant mechanism in the event of an HW failure (e.g., failure of the sensors responsible for detecting the vehicle movement). For example, engine or vehicle status information may be useful to prevent an undesired transition to a power saving mode (e.g., in a scenario in which the vehicle is stopped but the engine is running).

In another example implementation, a determination of whether to operate a node in a power saving mode and/or of the power saving mode in which to operate may be based, at least in part, on vehicle battery level. For example, if the battery level is below a particular threshold (e.g., while the vehicle is stopped), the operating mode of the node may be changed from the normal operating mode or a power saving mode to a turned-off mode. Note that such transition, as with all transitions discussed herein, may be performed automatically (e.g., without direct user interaction). Information regarding the vehicle's battery level may be provided by the OBD or other vehicle system (e.g., sensors/systems accessible via a wired (e.g., CAN bus) or wireless vehicle network). Such information may, for example, be analyzed in situations where the engine is off (e.g., in order to prevent battery discharging) and/or in the case of a HW failure, which may prevent the device from entering a power saving mode (e.g., failure of the sensors responsible for detecting the vehicle movement status).

In another example implementation, a determination of whether to operate a node in a power saving mode and/or of the power saving mode in which to operate may be based, at least in part, on temperature (e.g., temperature of the node or electronics thereof, etc.). For example, if the temperature of the HW system of the node (e.g., a Mobile AP, Fixed AP, etc.) is above a particular threshold, the operating mode of the device may transition from the normal operating mode to a power saving mode. The information regarding the HW temperature level may be provided by a temperature sensor either internal or external to the node. This information can be analyzed and used to protect the HW system from permanent damage. In this case, the node may be operated in a power saving mode (e.g., the SW Power Saving Mode), if a high-temperature condition is due to high resource consumption or utilization. Also for example, the node may be auto-reset and remain in the previous operating mode, if the problem is related to (or suspected to be related to) a HW malfunction. Note that the power saving mode in which to operate the node may change based on whether the high-temperature condition has been successfully addressed. For example, in a scenario in which the operating mode of the node was switched to the SW Power Saving Mode to address a high-temperature condition, and in which continued monitoring has indicated that the temperature is still too high, the operating mode of the node may be switched to the Sleep Mode. In such a manner, escalating remedial actions may be taken. In cases where power saving is initiated (e.g., to overly high temperature or other reason(s)), the node may notify a system external to the node (e.g., a Cloud-base system, a navigation system of an autonomous vehicle in which the node is located (e.g., Mobile AP)) that a power saving mode exists at the node, the reason for operation in the power saving mode (e.g., over-temperature, low remaining battery capacity, lack of sufficient motion, vehicle speed too high) and the time at which the action was taken to enter a power saving/power consumption reduction mode. In some example implementations, approval for a complete shutdown, or other reduction in power consumption of the node may involve approval from a system outside of the node (e.g., a Cloud-based system). In accordance with some aspects of the present disclosure, another system of the In another example implementation, a determination of whether to operate a node in a power saving mode and/or of the power saving mode in which to operate may be based, at least in part, on vehicle physical/geographic location. For example, depending on the location and/or type of the vehicle carrying a Mobile AP, operation of the Mobile AP may transition from the normal operating mode to a power saving mode. The vehicle's location may, for example, be provided by GNSS/GPS geolocation, detection of a network at a known physical/geographic location, cellular triangulation/trilateration, etc. Depending on the location and environment, the vehicle may need or desire some applications/ services to be turned on/off, because of the context of operation of the Mobile AP. Thus, the Mobile AP may be operated in a power saving mode (e.g., the SW Power Saving Mode). Also for example, in a scenario in which it is known (e.g., historically, due to detected real-time conditions, physical/geographic location, etc.) that a fully functional Mobile AP is needed at a particular physical/geographic location or region, the operating mode of the Mobile AP may be maintained in the normal operating mode when the Mobile AP would otherwise be operated in a power saving mode (e.g., unless a dangerous temperature condition is detected).

As discussed herein, the switching of the operating mode may also depend on information sourced by other nodes (e.g., local source information from a peer or parent node, global information from a Cloud-based entity, etc.). Such sources may, for example, be generally unrelated to the HW system of the node.

In an example implementation, information about the number of one-hop neighbors of a mobile AP (e.g., as detected by the Mobile AP, as advertised by a Cloud entity, etc.), and a threshold time after which the Mobile AP may enter a power saving mode, can be derived. For example, a metric may be calculated using one or more weighted parameters including, for example, a parameter representative of the number of one-hop neighbors of the vehicle in the vehicle network, a parameter representative of the time elapsed since the vehicle was stopped, and a parameter representative of the mobile AP utilization level (e.g., the number of users connected via Wi-Fi) since the vehicle was stopped. In an example scenario in which many Mobile APs are determined to be serving a region, the threshold for operating one of the Mobile APs in a power saving mode may be relatively easier to reach. Conversely, in a scenario in which only a small number of Mobile APs are determined to be serving a region, the threshold for operating one of such Mobile APs in a power saving mode may be relatively more difficult to reach.

In another example implementation, the information coming from the Cloud regarding the city, a particular fleet, or a zone status may also be analyzed, for example to prevent a Mobile AP (or other node) from entering a power saving mode in situations in which such operation is not desired. For example, in a scenario in which a vehicle is located in an area with a low density of vehicles (and their Mobile APs), it may be very important to remain in the normal operating mode in order to avoid a great reduction of the number of nodes in the vehicle network.

In another example implementation in which there is an energy failure in a region of a city, it may be highly desirable that the Mobile APs associated with vehicles in such region remain in the normal operating mode, so as to increase the number of nodes in the affected area, for example for direct communication, for routing information from other Mobile APs between such other Mobile APs and a Fixed AP, etc. In accordance with some aspects of the present disclosure, for example, autonomous vehicles may be directed towards or to remain in an area or region in which the number of vehicles with Mobile APs is below a certain threshold, in an attempt to ensure that wireless connectivity of the network in that area or region is maintained, while the nodes in the area or region may be prevented from entering a power saving mode, unless for reasons involving excessive temperature.

In another example implementation, a Fixed AP may be provided with a backup battery, in order to protect the Fixed AP from at least a short term energy failure. In such case, the Fixed AP may automatically reduce its energy consumption to preserve its battery life. This procedure may, however, be overridden by the means of a notification from the Cloud directing the Fixed AP to remain in the normal operating mode. For example, there might be no energy available in a region of the city and the network may need the Fixed AP to remain operating in the normal operating mode (e.g., to provide emergency communications, etc.).

In another example implementation, Mobile APs may also exchange notifications either with Fixed APs or other Mobile APs, regarding collected local statistics, that might trigger (or be considered in determining) the switching of operating modes. Such notifications may, for example, comprise information of the number of vehicles in the local zone, amount of traffic and/or client devices in the area, etc. For example, if the Fixed AP does not receive any notification from Mobile APs for more than a particular amount of time, it may enter a power saving mode (e.g., since the Fixed AP has no vehicles or Mobile APs nearby to service). Also for example, if the Fixed AP has many vehicles or Mobile APs thereof nearby, the Fixed AP may advertise (or message) the Mobile AP that the Mobile AP may enter a power saving mode if desired; otherwise if the Fixed AP has few vehicles nearby, the Fixed AP may prevent (or at least influence) the Mobile AP from entering a power saving mode. In another example scenario, if a Mobile AP does not receive any notification(s)/message(s) from another Mobile AP for more than a particular amount of time, the Mobile AP (e.g., a Power Control Unit thereof) may determine that the Mobile AP cannot enter a power saving mode (e.g., since there are likely no or few other Mobile APs serving the present region).

In another example implementation, a node may also consider time information when determining whether and/or how to enter into a power saving mode. For example, through historic utilization, a map of geographical region(s) and time may be formed that indicates the amount of vehicle network utilization. In such a scenario, even when other information (e.g., vehicle acceleration information, information of other nearby nodes, etc.) indicates that the node should enter a power saving mode, the node may determine to remain in the normal operating mode because the node is currently in a region and operating at a time that indicates a relatively large amount of expected service utilization.

In another example implementation, a node may also consider information regarding emergency conditions (e.g., explicit emergency warnings, imminent severe weather, accident information, etc.) when determining whether and/or how to enter into a power saving mode. For example, an emergency situation or a likely emergency situation may cause a node to remain operating in the normal operating mode when the node might otherwise have determined to operate in a power saving mode.

Figure 10:
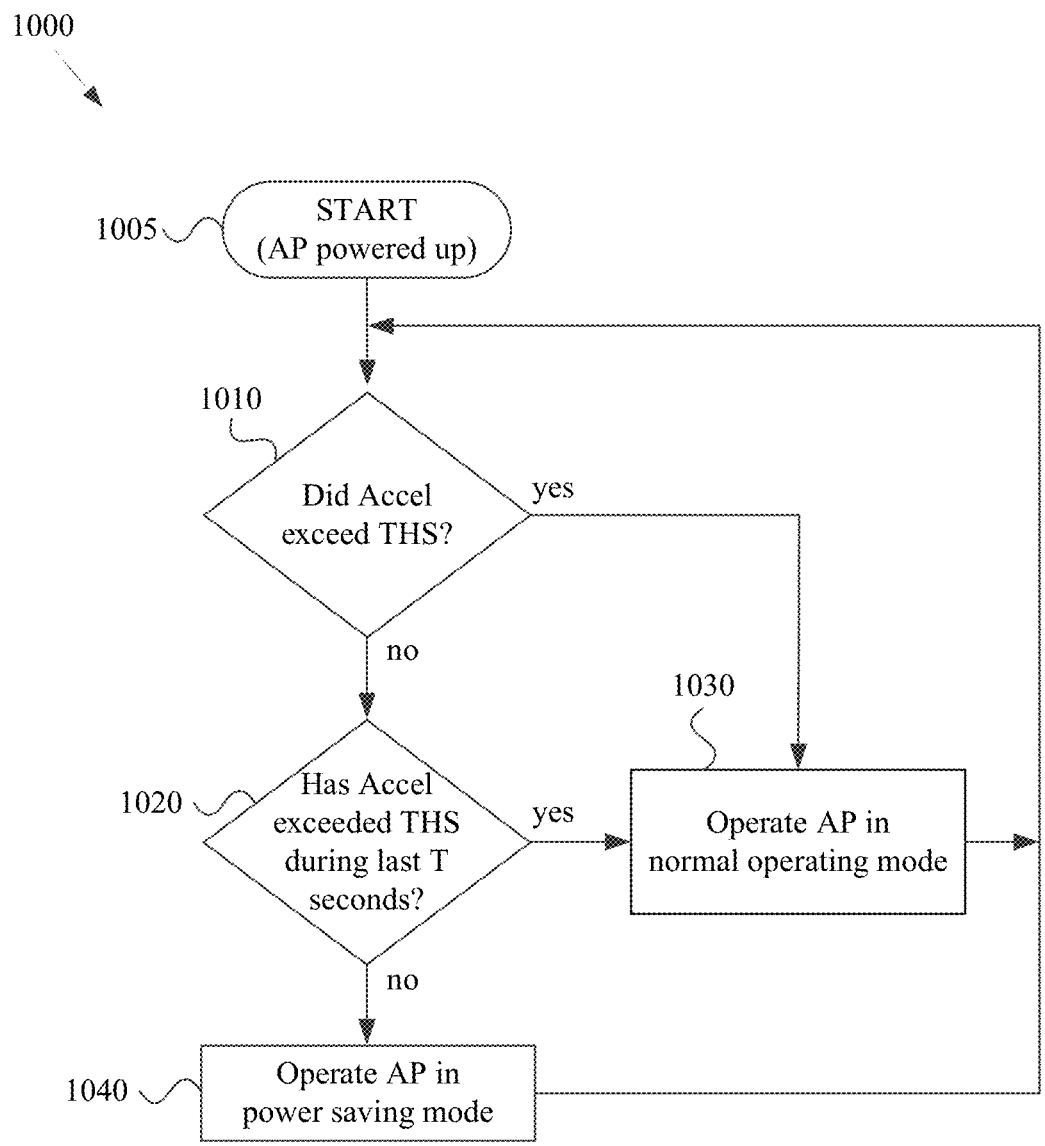
FIG. 10 shows a flow diagram of an example method of managing power, in accordance with various aspects of the present disclosure.

Another example implementation is shown graphically at FIG. 10 and will now be discussed.

The example method 1000 may, for example, share any or all characteristics with the other example methods, networks, and/or network components 100, 200, 300, 400, 500-570, 600, 700, 800, and 900, discussed herein. For example, any or all functions discussed with regard to the example method 1000 may be implemented by one or more of the network nodes discussed herein. For example, the example method 1000, or any portion thereof, may be implemented by the Power Control Unit 705 of the example node 700 of FIG. 7, by the Power Control Unit of the example Mobile APs and/or Fixed AP of FIG. 9, etc.

The example method 1000 begins executing at block 1005. The example method 1000 may begin executing in response to any of a variety of causes or conditions, non-limiting examples of which are presented herein. Block 1005 may, for example, share any or all characteristics with block 805 of the example method 800 of FIG. 8.

In an example implementation, the accelerometer may be the sensor primarily utilized for triggering a transition from the normal operating mode to a power saving mode. When the mobile AP is powered (e.g., at block 1005), the accelerometer starts detecting vehicle acceleration. When the acceleration exceeds a set threshold (THS), an interrupt signal is generated (e.g., by the accelerometer circuitry) to cause the Mobile AP to be kept in or to transition to the normal operating mode. For example, execution of the example method 1000 may flow from block 1010 to block 1030. This condition may, for example, be verified every t seconds, which can be defined taking into consideration the vehicle context.

Should vehicle acceleration not exceed the set threshold (THS) for a time longer than the user-definable (or otherwise configurable) time-out period (T), the Power Control Unit may switch off all connected components (including, for example, the main processing unit), other than the accelerometer, and may operate the node in a power saving mode (e.g., the Sleep Mode). Since the accelerometer remains powered and operational in power saving mode, when the acceleration exceeds the set threshold (e.g., even when the node is operating in a power saving mode), the accelerometer circuitry alerts the Power Control Unit to wake up the system and the node (e.g., the Mobile AP) transitions to the normal operating mode.

In an example implementation, all three axes (X, Y, Z) may be taken into consideration for motion detection, since the position (or orientation or attitude) of the Mobile AP in the vehicle might not be known. Therefore, in accordance with some aspects of the present disclosure, motion is detected when the magnitude of the X or Y or Z acceleration value is higher than the threshold value, THS. In accordance with other aspects of the present disclosure, additional characteristics of acceleration information from an accelerometer or other sources may be taken into account including, but not limited to, the length of the period of time in which acceleration in one or more axes takes place, or a particular combination or pattern of accelerations in the sensed axes.

The THS value of FIG. 10, or any other parameter used in evaluating acceleration information, may be user definable, which may be empirically fine-tuned, so as to distinguish between, for example, a stopped vehicle (e.g., acceleration value below the threshold) and a moving vehicle (e.g., acceleration value above the threshold). Also, the time-out period T may be defined, for example, according to the vehicle's context and battery capacity. For example, T may be larger when the Mobile AP has access to a battery with a relatively larger capacity (e.g., enabling the Mobile AP to remain awake longer without the battery being recharged or depleted below a configurable minimum capacity).

The example implementations above may, for example, apply to every type of terrestrial vehicle (e.g., cars, taxis, trucks, autonomous vehicles) provided that the parameters (e.g., THS, T, t and the axes), are appropriately adapted to each case. In the context of a boat-mounted Mobile AP, the example implementation may be enhanced to improve performance. For example, when moving or not, boats may be subject to various forms of acceleration (e.g., based on wind, water, etc.), and such accelerations may also vary substantially depending on the type of boat (e.g., different boat size, different boat weight, etc.). In an example implementation, GNSS/GPS tracking information may be used as an alternative and/or as a supplement to accelerometer information. As discussed herein, a variety of different types of information may often be utilized to determine vehicle context. In an example implementation involving a boat-mounted Mobile AP, in some situations, the transition to a power saving mode is not desired when the boat has stopped moving for a period of time. In this case, GNSS/GPS information may be utilized to generate a geo-fence area where such operation (e.g., the transition to a power saving mode based on vehicle stoppage) is deactivated. This is generally analogous to one or more other examples discussed herein in which a terrestrial vehicle (e.g., a bus, train, autonomous vehicle, etc.) might not be allowed to enter a power saving mode based on its geographical position.

Many aspects in accordance with the present disclosure have been described herein. A method and system operating in accordance with such aspects may derive many benefits therefrom. For example, energy costs may be reduced. Also for example, battery costs may be reduced, for example by reducing the number of charge/discharge cycles. Additionally for example, vehicle batteries are prevented from fully discharging and thus rendering the vehicle inoperable. Various aspects of this disclosure provide for a straight-forward adaptation to several deployment scenarios through a combination of its parameterisable nature with a set of selected metrics which substantially increase energy savings.

A system implemented in accordance with various aspects of this disclosure provides several competitive advantages to the company operating the network of nodes, mainly regarding the service it provides to its customers. For example, battery protection and preservation may be of substantial importance to the company's clients. For example, energy may be a cost metric of the company's solution. A business model may, for example, require the fleet or vehicle to pay for the usage of the Mobile AP, for example the amount of usage of the vehicle's battery. In this case, saving energy is beneficial from the client's perspective.

Additionally, a system implemented in accordance with various aspects of this disclosure provides adaptability, for example due to the parameterisable nature of various operational aspects discussed herein. Such flexibility favors the deployment of the system in a wider variety of vehicles, which allows the company to broaden its range of activities and reduce costs.

Various aspects of the present disclosure may be seen in a method of operating a first node of a plurality of nodes of a network. Each node of the network may comprise at least one processor, a power system, a plurality of sensors, and a plurality of data communication interfaces. The first node may be configurable to communicate with other nodes of the network and with a cloud-based system and to manage power consumption of the first node. Such a method may comprising initializing an operating mode of the first node to a first operating mode of a plurality of operating modes, according to configuration information received by the first node, each of the operating modes consuming a corresponding amount of power; and monitoring power consumption information produced by the power system of the first node and respective signals produced by the plurality of sensors of the first node. The method may also comprise determining whether one or more operating conditions of the first node have occurred using the power consumption information, the signals produced by the plurality of sensors, and the configuration information; and adjusting the power consumption of the first node by changing the operating mode of the first node from the first operating mode to a second operating mode, based on occurrence of the one or more operating conditions.

In accordance with various aspects of the present disclosure, the method may comprise sending notification of occurrence of the one or more operating condition of the first node to an entity separate from the first node, based on the determination. The entity separate from the first node may be a second node of the plurality of nodes that is wirelessly linked to the first node, and the entity separate from the first node may be a system of an autonomous vehicle carrying the first node. The configuration information may be received by the first node from the cloud-based system, and the entity separate from the first node is the cloud-based system, and the configuration information may be received from the cloud-based system via a second node of the plurality of nodes of the network. The plurality of sensors may comprise a global navigation satellite system (GNSS) receiver, and the GNSS receiver may comprise a global positioning system (GPS) receiver. The method may comprise determining a geographic location of the first node.

In accordance with aspects of the present disclosure, the one or more operating conditions of the first node may cause adjustment of the power consumption of the first node when it is determined that a geographic location of the first node is within a particular geographic region. Determining whether one or more operating conditions of the first node have occurred may comprise determining an amount of movement of the first node. Changing the operating mode of the first node from the first mode to the second mode may reduce power consumption of the first node. The plurality of data communication interfaces may comprise a data communication interface that enables communication using an on-board diagnostic (OBD) communication protocol with one or more systems of a vehicle in which the first node is carried, and the determining may take into account at least one parameter received by the first node from the one or more systems of the vehicle in which the first node is carried. The at least one signal representative of a parameter of a vehicle in which the first node is carried may comprise an indication of whether the vehicle is running, and the at least one signal representative of a vehicle parameter may be produced by a system of an autonomous vehicle in which the first node is carried.

Additional aspects of the present disclosure may be found in non-transitory computer-readable medium having a plurality of code sections. Each code section may comprise a plurality of instructions executable by one or more processors to cause the one or more processors to perform a method of operating a first node of a plurality of nodes of a network. Each node of the network may comprise at least one processor, a power system, a plurality of sensors, and a plurality of data communication interfaces. The first node may be configurable to communicate with other nodes of the network and with a cloud-based system and to manage power consumption of the first node. The steps of the method may comprise those of the method described above.

Further aspects of the present disclosure may be observed in a system for use in a plurality of nodes of a network, where each node of the network may be configurable to communicate in a wireless or wired manner with other nodes of the network and with a cloud-based system. The nodes may operate as at least one of a first type of node for use in performing a first function in the network and a second type of node for use in performing a second function in the network. The system may comprise at least one processor operatively coupled to a power system, a plurality of sensors, and a plurality of data communication interfaces, and the at least one processor may be operable to, at least, perform the steps of the method described above.

Additional aspects of the present disclosure may be found in a system for use in a plurality of nodes of a network, where each node of the network may comprise at least one processor coupled to a power system, a plurality of sensors, and a plurality of data communication interfaces. The first node may be configurable to communicate with other nodes of the network and with a cloud-based system and to manage power consumption of the first node. The at least one processor may be operable to, at least, perform the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of operating a first node of a plurality of nodes of a network, each node of the network comprising at least one processor, a power system, a plurality of sensors, and a plurality of data communication interfaces, the first node configurable to communicate with other nodes of the network and with a cloud-based system and to manage power consumption of the first node, the method comprising:

initializing an operating mode of the first node to a first operating mode of a plurality of operating modes, according to configuration information received by the first node, each of the operating modes consuming a corresponding amount of power;

monitoring power consumption information produced by the power system of the first node and respective signals produced by the plurality of sensors of the first node;

determining whether one or more operating conditions of the first node have occurred using the power consumption information, the signals produced by the plurality of sensors, and the configuration information; and adjusting the power consumption of the first node by changing the operating mode of the first node from the first operating mode to a second operating mode, based on occurrence of the one or more operating conditions.

2. The method according to claim 1, wherein the method comprises sending notification of occurrence of the one or more operating condition of the first node to an entity separate from the first node, based on the determination.

3. The method according to claim 2, wherein the entity separate from the first node is a second node of the plurality of nodes that is wirelessly linked to the first node.

4. The method according to claim 2, wherein the entity separate from the first node is a system of an autonomous vehicle carrying the first node.

5. The method according to claim 2, wherein the configuration information is received by the first node from the cloud-based system, and the entity separate from the first node is the cloud-based system.

6. The method according to claim 1, wherein the configuration information is received from the cloud-based system via a second node of the plurality of nodes of the network.

7. The method according to claim 1, wherein changing the operating mode of the first node from the first mode to the second mode reduces power consumption of the first node.

8. A non-transitory computer-readable medium having stored thereon a plurality of code sections, each code section comprising a plurality of instructions executable by one or more processors to cause the one or more processors to perform a method of operating a first node of a plurality of nodes of a network, each node of the network comprising at least one processor, a power system, a plurality of sensors, and a plurality of data communication interfaces, the first node configurable to communicate with other nodes of the network and with a cloud-based system and to manage power consumption of the first node, the steps of the method comprising:
   initializing an operating mode of the first node to a first operating mode of a plurality of operating modes, according to configuration information received by the first node, each of the operating modes consuming a corresponding amount of power;
   monitoring power consumption information produced by the power system of the first node and respective signals produced by the plurality of sensors of the first node;
   determining whether one or more operating conditions of the first node have occurred using the power consumption information, the signals produced by the plurality of sensors, and the configuration information; and
   adjusting the power consumption of the first node by changing the operating mode of the first node from the first operating mode to a second operating mode, based on occurrence of the one or more operating conditions.

9. The non-transitory computer-readable medium according to claim 8, wherein the steps of the method comprise sending notification of occurrence of the one or more operating condition of the first node to an entity separate from the first node, based on the determination.

10. The non-transitory computer-readable medium according to claim 9, wherein the entity separate from the first node is a second node of the plurality of nodes that is wirelessly linked to the first node.

11. The non-transitory computer-readable medium according to claim 9, wherein the entity separate from the first node is a system of an autonomous vehicle carrying the first node.

12. The non-transitory computer-readable medium according to claim 9, wherein the configuration information is received by the first node from the cloud-based system, and the entity separate from the first node is the cloud-based system.

13. The non-transitory computer-readable medium according to claim 8, wherein the configuration information is received from the cloud-based system via a second node of the plurality of nodes of the network.

14. The non-transitory computer-readable medium according to claim 8, wherein changing the operating mode of the first node from the first mode to the second mode reduces power consumption of the first node.

15. A system for use in a plurality of nodes of a network, each node of the network comprising at least one processor, a power system, a plurality of sensors, and a plurality of data communication interfaces, the first node configurable to communicate with other nodes of the network and with a cloud-based system and to manage power consumption of the first node, the system comprising:
   at least one processor operatively coupled to:
      a power system,
      a plurality of sensors, and
      a plurality of data communication interfaces; and
   wherein the at least one processor is operable to, at least:
      initialize an operating mode of the first node to a first operating mode of a plurality of operating modes, according to configuration information received by the first node, each of the operating modes consuming a corresponding amount of power,
      monitor power consumption information produced by the power system of the first node and respective signals produced by the plurality of sensors of the first node,
      determine whether one or more operating conditions of the first node have occurred using the power consumption information, the signals produced by the plurality of sensors, and the configuration information, and
      adjust the power consumption of the first node by changing the operating mode of the first node from the first operating mode to a second operating mode, based on occurrence of the one or more operating conditions.

16. The system according to claim 15, wherein the at least one processor is operable to, at least, send notification of occurrence of the one or more operating condition of the first node to an entity separate from the first node, based on the determination.

17. The system according to claim 16, wherein the entity separate from the first node is a second node of the plurality of nodes that is wirelessly linked to the first node.

18. The system according to claim 16, wherein the entity separate from the first node is a system of an autonomous vehicle carrying the first node.

19. The system according to claim 16, wherein the configuration information is received by the first node from the cloud-based system, and the entity separate from the first node is the cloud-based system.

20. The system according to claim 15, wherein the configuration information is received from the cloud-based system via a second node of the plurality of nodes of the network.

21. The system according to claim 15, wherein changing the operating mode of the first node from the first mode to the second mode reduces power consumption of the first node.

* * * * *